United States Patent
Hippel et al.

Patent Number: 5,785,942
Date of Patent: Jul. 28, 1998

[54] PROCESS FOR THE PRODUCTION OF HYDROCYANIC ACID

[75] Inventors: Lukas Von Hippel, Alzenau; Christian Bussek, Kahl; Dietrich Arntz, Oberursel, all of Germany

[73] Assignee: Degussa Aktiengesellschaft, Frankfurt am Main, Germany

[21] Appl. No.: 670,980

[22] Filed: Jun. 28, 1996

[30] Foreign Application Priority Data

Jul. 3, 1995 [DE] Germany ............... 195 24 158.4

[51] Int. Cl.$^6$ .................................................. C01C 3/02
[52] U.S. Cl. ................................... 423/376; 423/659
[58] Field of Search .............................. 423/376, 659

[56] References Cited

U.S. PATENT DOCUMENTS

| | | | |
|---|---|---|---|
| 4,594,234 | 6/1986 | Manner et al. | 423/376 |
| 4,834,962 | 5/1989 | Ludwig | 423/659 |
| 4,985,230 | 1/1991 | Baden et al. | 423/659 |
| 5,039,643 | 8/1991 | Hecht et al. | 502/200 |
| 5,250,489 | 10/1993 | Dalla Betta et al. | 502/527 |
| 5,492,686 | 2/1996 | Hill | 423/580.1 |

FOREIGN PATENT DOCUMENTS

| | | |
|---|---|---|
| A-0 074 504 | 3/1983 | European Pat. Off. . |
| A-0 299 175 | 1/1989 | European Pat. Off. . |
| A-0 407 809 | 1/1991 | European Pat. Off. . |
| B-10 68 681 | 11/1959 | Germany . |
| B-12 05 499 | 11/1965 | Germany . |
| WO-A-88 06941 | 9/1988 | WIPO . |

OTHER PUBLICATIONS

Ullmann's Encyclopedia of Industrial Chemistry, 5th ed. (1987), vol. A8, 162–163.

*Primary Examiner*—Wayne Langel
*Attorney, Agent, or Firm*—Beveridge, DeGrandi, Weilacher & Young, LLP

[57] ABSTRACT

A process for the highly efficient production of hydrocyanic acid by reacting methane and ammonia to yield hydrocyanic acid in a reactor heated by the combustion of fuel gases and coated with a catalyst. The process is characterized in that the reactor consists of a monolithic arrangement of heating and reaction channels, wherein the fuel gas and a gas containing oxygen pass through the heating channels and the reactants pass through the reaction channels, the internal walls of which are coated with the catalyst. The fuel gas is burned in the heating channels. The monolithic structure of the reactor is such that the heating channels and reaction channels are in intimate contact. The cross-section of the channels and the wall thicknesses thereof may be reduced without any loss of mechanical stability. Wall thicknesses of 0.1 to 1 mm are completely adequate. The heating and reaction channels of the reactor may be arranged in alternating layers, wherein the axial directions of the heating and reaction channels may enclose an angle of between 0° and 90°. If the angle is 0°, the heating and reaction channels are parallel and the heating and reaction gases may pass through them co- or counter-currently.

11 Claims, 1 Drawing Sheet

PROCESS FOR THE PRODUCTION OF HYDROCYANIC ACID

INTRODUCTION AND BACKGROUND

The present invention relates to a process for the production of hydrocyanic acid using the so-called BMA process by reacting methane and ammonia to yield hydrocyanic acid in a reactor heated by fuel gases and coated with a catalyst.

Using the so-called BMA process, lower hydrocarbons, in particular methane, are reacted with ammonia at temperatures of approximately 1000° to 1350° C. in the presence of a catalyst to yield hydrocyanic acid and hydrogen, see *Ullmann's Encyclopedia of Industrial Chemistry*, 5th ed. (1987), volume A8, 162–163. The reaction is conventionally performed in multi-tube reactors. The reaction tubes substantially consist of aluminium oxide and their internal surface is provided with a catalytically active coating, which usually contains platinum. The reaction tubes are suspended in a combustion chamber and heated to the reaction temperature by the combustion of a fuel gas, usually methane or natural gas, in a gas containing oxygen, which combustion proceeds in the combustion chamber. The reaction tubes are typically approximately 2 m in length and have an internal diameter of approximately 16 to 18 mm.

The tubes used must be gas-tight and resistant to the elevated temperatures. The catalyst is deposited on the internal surface of these tubes. A preferred catalytic coating contains platinum and aluminium nitride.

EP 0 407 809 B1 describes a particularly advantageous process for the production of this catalytically active coating, which is distinguished in that highly active coatings are obtained at loadings of as low as only 2 mg of platinum/$cm^2$ of the internal surface.

In order to produce hydrocyanic acid, a mixture of ammonia and methane (natural or refined gas containing 50 to 100 vol. % of methane) is passed through the reaction tubes and very rapidly heated to approximately 1300° C. at standard pressure. In order to avoid the formation of troublesome soot deposits on the internal surfaces, the molar ratio of ammonia to methane is maintained within the range from 1.01 to 1.08.

Using this known prior art process for the production of hydrocyanic acid, yields of approximately 90%, relative to the introduced methane, are achieved. The energy input for production is approximately 40 MJ/kg of hydrocyanic acid produced.

The object of the present invention is to provide an improved process for the production of hydrocyanic acid which, in comparison with the prior art, has a substantially lower energy input per kg of hydrocyanic acid produced and an improved space-time yield. A further object of the invention is to provide a simpler reactor design with an improved surface area/volume ratio for the synthesis of hydrocyanic acid, which design is distinguished by a compact structure and low capital costs.

SUMMARY OF THE INVENTION

This object is achieved by a process for the production of hydrocyanic acid using the so-called BMA process by reacting the reactants methane and ammonia to yield hydrocyanic acid in a reactor heated by combustion of a fuel gas and coated with a catalyst. The process is characterised in that the reactor consists of a monolithic arrangement of heating and reaction channels, wherein the fuel gas and a gas containing oxygen pass through the heating channels and the reactants pass through the reaction channels, the internal walls of which are coated with the catalyst, and in that the fuel gas is burnt in the heating channels.

The endothermic reaction of methane and ammonia to yield hydrocyanic acid is performed on the catalyst in the reaction channels at a reaction temperature of between 1000° and 1350° C. In order to maintain the reaction temperature and to supply the necessary energy for the endothermic reaction, a mixture of a fuel gas and a gas containing oxygen, for example combustion air, is introduced into the heating channels and burnt in the channels. The fuel gases may be, for example, methane or natural gas. The mixture of fuel gas and combustion air is ignited as it enters the heating channels by electric heating wires introduced into the heating channels.

Combining the heating and reaction channels into a monolithic arrangement gives rise to many options for optimisation, all of which result in a reduced energy requirement per kg of hydrocyanic acid produced.

BRIEF DESCRIPTION OF DRAWINGS

The present invention will be further understood with reference to the drawings, wherein.

DETAILED DESCRIPTION OF THE INVENTION

Figure 1:
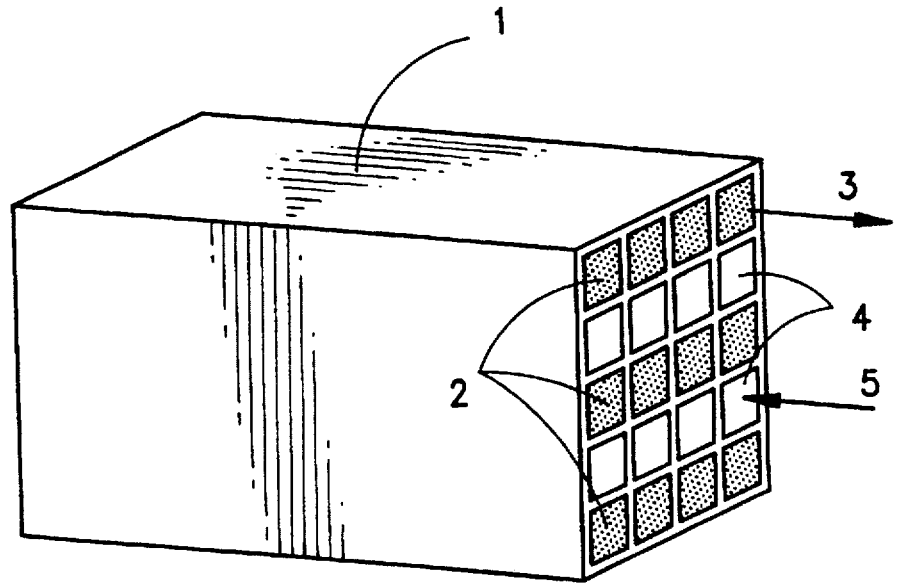
FIG. 1 is a schematic prospective view of one embodiment of the invention.

Due to the monolithic structure of the reactor, the heating channels and reaction channels are in intimate contact. The cross-section of the channels and the wall thicknesses thereof may be reduced without any loss of mechanical stability. Wall thicknesses of 0.1 to 1 mm are completely adequate. The cross-sectional shape of the channels is largely as desired, but triangular, hexagonal, rectangular and in particular square channels have proved particularly successful. The density of the channels across the cross-section of the reactor may be between 0.1 and 100 $cm^{-2}$, preferably between 0.1 and 50 $cm^{-2}$.

The heating and reaction channels of the reactor may be arranged in alternating layers, wherein the axial directions of the heating and reaction channels may enclose an angle of between 0° and 90°. If the angle is 0°, the heating and reaction channels are parallel and the heating and reaction gases may pass through them co- or counter-currently. Counter-current flow is preferred on energy grounds.

An angle of greater than 0° between the axial directions of the heating and reaction channels simplifies separate feeding of the heating and reaction gases. A cross-current arrangement with an angle of 90° is a particular case.

Conventional reaction tubes for the BMA process have a diameter of approximately 25 mm with wall thicknesses of approximately 2 mm. Comparison with the above-stated dimensions of the monolithic arrangement to be used according to the invention shows that transfer of heat from the combustion gases to the reaction media proceeds substantially better than in conventional multi-tube reactors. Energy input per kg of hydrocyanic acid produced is accordingly lower.

It was possible to halve energy input in the following examples. It would seem possible to reduce energy input to a quarter of that of conventional multi-tube reactors by optimising the geometry of the monolithic structures.

A further advantage of the process according to the invention is the compact structure of the monolithic reactor.

This makes it possible substantially to increase the space-time yield. Under optimum conditions, this yield may be doubled. The same quantity of product may thus be produced with substantially smaller plant.

In a reactor with parallel heating and reaction channels, an arrangement of the heating or reaction channels in layers or rows is also preferred, as this facilitates feeding and discharge of the heating and reaction gases. It is also possible to combine two or more rows of channels for heating and two or more rows of channels for synthesis. In this case, however, the thickness of the tiers of heating or reaction channels so produced should not exceed approximately 25 mm in order not excessively to impair heat exchange between the heating and reaction channels.

In the case of parallel channel axes, it is also possible, in addition to the layered arrangement of heating and reaction channels, to have any desired distribution of heating and reaction channels over the cross-section of the reactor, for example an arrangement in a chess board pattern.

The walls of the reactor channels must be gas-tight to ensure that the reactants cannot pass through into the heating channels and vice versa. Suitable materials for the reactor are, for example, ceramics made from oxides, carbides and nitrides and from mixtures thereof. It is, however, also possible to use metallic reactors with suitable catalytically active coatings. If the ceramics used are porous materials, the reactor walls must be provided with a gas-tight coating. The reactor is preferably made from alpha- or gamma-aluminium oxide. As a consequence of the production process, this material may also contain small quantities of other oxides.

In the case of parallel heating and reaction channels, the monolithic reactor to be used according to the invention may be produced from the ceramic materials using known extrusion techniques. The production of metal monolithic structures with parallel flow channels is also known prior art. Where the heating and reaction channels are arranged crosswise relative to each other, the layers of heating and reaction channels must be produced separately and then stacked one above the other.

Various techniques may be used for producing the catalytic coating on the reaction channels. For small production lots, the reaction channels may, for example, be filled with the coating suspension with a spray. The excess coating dispersion is then allowed to run out and any reaction channels which are still blocked are blown clear with compressed air. The catalytic coating is then subjected to conventional calcination and conditioning treatments, as described in EP 0 407 809 B1.

Figure 2:
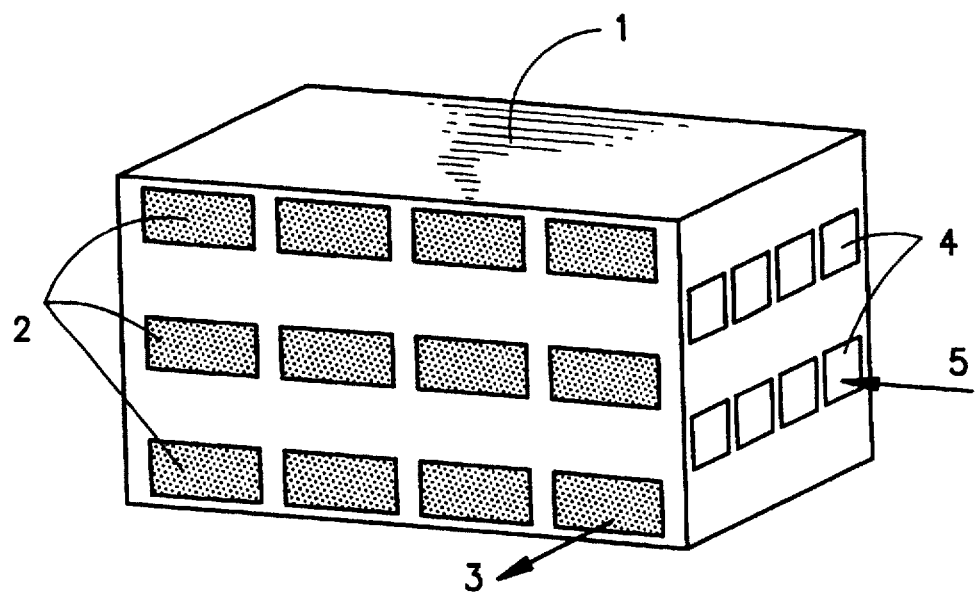
FIG. 2 is a schematic prospective view of another embodiment of the invention.

The invention is illustrated by means of the following examples. FIGS. 1 and 2 show possible reactor geometries. In each case, 1 designates the monolithic reactor. In the reactor according to FIG. 1, the heating channels 2 and reaction channels 4 are parallel to each other and are arranged in alternating layers. The heating gas 3 (mixture of fuel gas and an oxygen containing gas) and reactants 5 flow counter-currently through the heating and reaction channels. The heating and reaction channels in FIG. 2 are also arranged in alternating layers. There is an angle of 90° between their axial directions. In this case, the heating channels are rectangular in shape.

COMPARATIVE EXAMPLE

An aluminium oxide tube 2.1 m in length with an internal diameter of 17.8 mm was used as a reaction tube in order to produce hydrocyanic acid according to the prior art. The resultant reaction volume was 523 ml. The tube was coated with a catalyst according to example 2 from EP 0 407 809 B1 and, once the solvent had evaporated (at variance with example 2 from EP '809, toluene was used as the solvent instead of ethanol), heated externally for 12 hours to 1320OC. During this calcination and conditioning phase, a stream of 32 mol/h of ammonia was passed through the reaction tube. In order to produce hydrocyanic acid, methane was then added to the stream of ammonia until a stream of 30.5 mol/h of methane was achieved. Analysis of the educt stream revealed a hydrocyanic acid yield of 91% relative to the introduced stream of methane. This corresponded to a space-time yield of 1434 g of hydrocyanic acid per liter of reaction volume per hour. The energy required to produce this hydrocyanic acid was 58.9 MJ/lh. The energy requirement for the production of 1 kg of hydrocyanic acid may thus be calculated at 41.1 MJ.

EXAMPLE 1

The following method was used for the production of hydrocyanic acid according to the invention: a monolithic reactor as in FIG. 1 of a length of 50 cm and a cross-sectional area of 2.73 cm×2.73 cm and a channel density of 15.5 channels/cm$^2$ (corresponding to 100 cpsi [channels per square inch]) was coated with a catalyst as in the comparative example in such a manner that only every second row of channels contained catalyst, while the other rows of channels were used for heating. The monolith consisted of aluminium oxide. The reaction and heating gases were passed counter-currently. The free cross-sectional area of all the channels of the monolith was 1 cm$^2$. As only every second row of channels was used for the reaction, the reaction volume in this example was only 25 ml.

Once dry, the catalyst was pretreated for 12 hours with a stream of 3 mol/h of ammonia through the reaction channels with combustion in the heating channels. After pretreatment, methane was added in stages up to a stream of 2.9 mol/h of methane. A yield of 92% hydrocyanic acid, relative to methane, was finally achieved at 1170° C., corresponding to a space-time yield of 2881 g/lh. The energy required for production was 83.3 MJ/lh. This gives an energy input of 20.3 MJ per kilogram of hydrocyanic acid produced.

EXAMPLE 2

A monolithic reactor as in FIG. 1 of a length of 50 cm and a cross-sectional area of 7×7 cm was used for the production of hydrocyanic acid according to the invention. The channel density of the reactor was 3.56 cm$^{-2}$ (corresponding to 23 cpsi) and its reaction volume was 900 ml. The free cross-sectional area of all the channels in the monolithic structure was 36 cm$^2$ in this case.

The catalyst was pretreated with 90 mol/h of ammonia and then supplied with 85.5 mol/h of methane. A yield of 91% hydrocyanic acid relative to methane was found at 1300° C., corresponding to a space-time yield of 2334 g/lh. The energy required for production was 75.8 MJ. This gives an energy input of 32.5 MJ per kilogram of hydrocyanic acid produced.

As these examples show, it is possible substantially to reduce the energy input for the production of hydrocyanic acid and to increase the space-time yield, by the use according to the invention of a monolithic reactor, through which the heating and reaction gases are passed counter-currently.

Further variations and modifications of the foregoing will be apparent to those skilled in the art and are intended to be encompassed by the claims appended hereto.

German Priority Application 195 24 158.4 is relied on and incorporated herein by reference.

We claim:

1. A process for the production of hydrocyanic acid comprising:
    reacting as the reactants methane and ammonia in a reactor heated by the combustion of a fuel gas and coated with a catalyst;
    said reactor comprising a monolithic arrangement of heating and reaction channels for efficient heat transfer between channels through which reaction gases and heating gases pass;
    said monolithic arrangement of channels being layered on top of or adjacent to each other;
    said reaction channels having their internal walls coated with catalyst, and burning said fuel gas in said heating channels to provide heat for the reaction between the methane and ammonia in the reaction channels to yield hydrocyanic acid.

2. A process according to claim 1, wherein the heating and reaction channels of the reactor are arranged in layers and the axial directions of the heating and reaction channels enclose an angle of between 0° and 90°.

3. A process according to claim 1, wherein the heating and reaction channels are arranged perpendicular to each other.

4. A process according to claim 1, wherein the heating and reaction channels are parallel to each other.

5. A process according to claim 4, wherein the heating gases and reactant gases flow cocurrently or countercurrently through the reactor.

6. A process according to claim 1, wherein the heating and reaction channels are combined each in parallel tiers, including one or more layers of heating or reaction channels.

7. A process according to claim 6, wherein the thickness of the heating or reaction channels combined into tiers of two or more layers does not exceed 25 mm.

8. A process according to claim 1, wherein the reactor has channel densities of between 0.1 and 100 $cm^{-2}$ and is a ceramic made from an oxide, carbide or nitride or mixtures thereof.

9. A process according to claim 1, wherein the reactor is a single layer.

10. A process according to claim 1, wherein the heating and reactor channels alternate within the same monolithic layer.

11. A process according to claim 10, wherein the monolithic layers are combined each in parallel tiers, including multiple layers of heating or reaction channels such that heating and reaction channels alternate between adjacent layers.

* * * * *